(12) United States Patent
Soukup

(10) Patent No.: US 9,010,995 B2
(45) Date of Patent: Apr. 21, 2015

(54) MIXING APPARATUS AND METHOD

(75) Inventor: Michael J. Soukup, Harrisville, NY (US)

(73) Assignee: Slack Chemical Co, Inc., Carthage, NY (US)

(*) Notice: Subject to any disclaimer, the term of this patent is extended or adjusted under 35 U.S.C. 154(b) by 307 days.

(21) Appl. No.: 13/422,785

(22) Filed: Mar. 16, 2012

(65) Prior Publication Data
US 2013/0242692 A1    Sep. 19, 2013

(51) Int. Cl.
B01F 5/06    (2006.01)
B01F 5/00    (2006.01)

(52) U.S. Cl.
CPC .............. *B01F 5/0688* (2013.01); *B01F 5/0689* (2013.01); *B01F 2005/0022* (2013.01); *B01F 2215/0052* (2013.01)

(58) Field of Classification Search
CPC ..... B01F 5/0682; B01F 13/0059; B01F 5/064
USPC ........................... 336/336, 337, 338, 339, 340
See application file for complete search history.

(56) References Cited

U.S. PATENT DOCUMENTS

| | | | | |
|---|---|---|---|---|
| 1,441,445 A * | 1/1923 | Naugle | ........................ | 210/227 |
| 2,758,877 A * | 8/1956 | Gleason | ........................ | 422/113 |
| 4,068,830 A | 1/1978 | Gray | | |
| 4,136,976 A | 1/1979 | Leffelman | | |
| 4,352,573 A * | 10/1982 | Pandolfe | ........................ | 366/337 |
| 4,384,789 A | 5/1983 | Avery, Jr. | | |
| 4,614,440 A | 9/1986 | King | | |
| 4,701,055 A * | 10/1987 | Anderson | ..................... | 366/336 |
| 5,137,369 A | 8/1992 | Hodan | | |
| 6,722,780 B2 | 4/2004 | Stein et al. | | |
| 7,621,670 B1 * | 11/2009 | England et al. | ............... | 366/340 |
| 2011/0305104 A1 | 12/2011 | McGuire et al. | | |

* cited by examiner

*Primary Examiner* — Tony G Soohoo
*Assistant Examiner* — Anshu Bhatia
(74) *Attorney, Agent, or Firm* — Heslin Rothenberg Farley & Mesiti PC

(57) ABSTRACT

A mixing apparatus includes a housing having an inner chamber, an inlet, and an outlet; an outlet conduit having a first and second end, the second end providing communication between the inner chamber and the outlet; and one or more dispersion members configured to mix one or more fluids, the one or more dispersion members extending between the outlet conduit and the housing. The dispersion members include a plate having a first and second side, a first opening in the plate for receiving an outlet conduit of the mixing device, and a plurality of second openings in the plate. The plurality of second openings has a first and second side. The first and second sides of the plurality of second openings have chamfered edges.

18 Claims, 7 Drawing Sheets

MIXING APPARATUS AND METHOD

TECHNICAL FIELD

The present disclosure relates generally to a mixing apparatus, and more particularly, to mixing and diluting chemicals for the water and wastewater treatment industry, as well as, a mixer for the addition of a chemical solution to water flows for water treatment, for example, in individual residential water systems.

BACKGROUND

Currently available mixing devices, some of which use an impeller style mixer, may cause shearing or breaking of polymer chains in the chemicals being diluted or mixed by the mixing device. In addition, the currently used mixing devices may fail to allow the polymer chains to fully open before the mixed and diluted chemical is used. If the polymer chains of a chemical are sheared, broken, or not fully open prior to introduction into the process in which they are being used, then the diluted chemical will not be as effective.

The present disclosure contemplates a new and improved mixing apparatus and method that overcome the current limitations.

SUMMARY

In one aspect provided herein, is a novel mixing apparatus including a housing, an outlet conduit, and one or more dispersion plates. The housing has an inner chamber, an inlet, and an outlet. The outlet conduit has a first end and a second end and the second end of the outlet conduit providing fluid communication between the housing's inner chamber and the outlet. The one or more dispersion plates are configured to mix one or more fluids and the one or more dispersion plates extend between the outlet conduit and the housing.

In another aspect provided herein, is a dispersion plate of a mixing apparatus. The dispersion plate includes a plate having a first side and a second side, a first opening in the plate, and a plurality of second openings in the plate. The first opening is for receiving an outlet conduit of the mixing device. The plurality of second openings has a first side and a second side and the first and second sides have chamfered edges.

In yet another aspect of the present invention provided herein, is a method of mixing and diluting a concentrated fluid in a mixing device. The method includes delivering the concentrated fluid into a stream of dilution fluid outside a housing of the mixing device. The concentrated fluid and the dilution fluid are supplied into the housing through an inlet. The concentrated fluid and the dilution fluid are mixed in an inner chamber of the housing, wherein the mixing includes passing the concentrated fluid and the dilution fluid through a plurality of first openings in one or more dispersion members in the inner chamber of the housing to blend the concentrated fluid and the dilution fluid to form a mixed fluid. The mixed fluid is discharged through an outlet conduit from the inner chamber of the housing to an outlet of the housing, wherein a pressure of the concentrated fluid and the dilution fluid at the inlet forces the mixed fluid out of the housing through the outlet conduit and the outlet.

These, and other embodiments, objects, features and advantages of this invention will become apparent from the following detailed description of the various aspects of the invention taken in conjunction with the accompanying drawings and are considered a part of the claimed invention.

BRIEF DESCRIPTION OF DRAWINGS

The accompanying drawings, which are incorporated in and constitute a part of the specification, illustrate embodiments of the invention and together with the detailed description herein, serve to explain the principles of the invention. The drawings are only for purposes of illustrating preferred embodiments and are not to be construed as limiting the invention.

DETAILED DESCRIPTION

Figure 1:
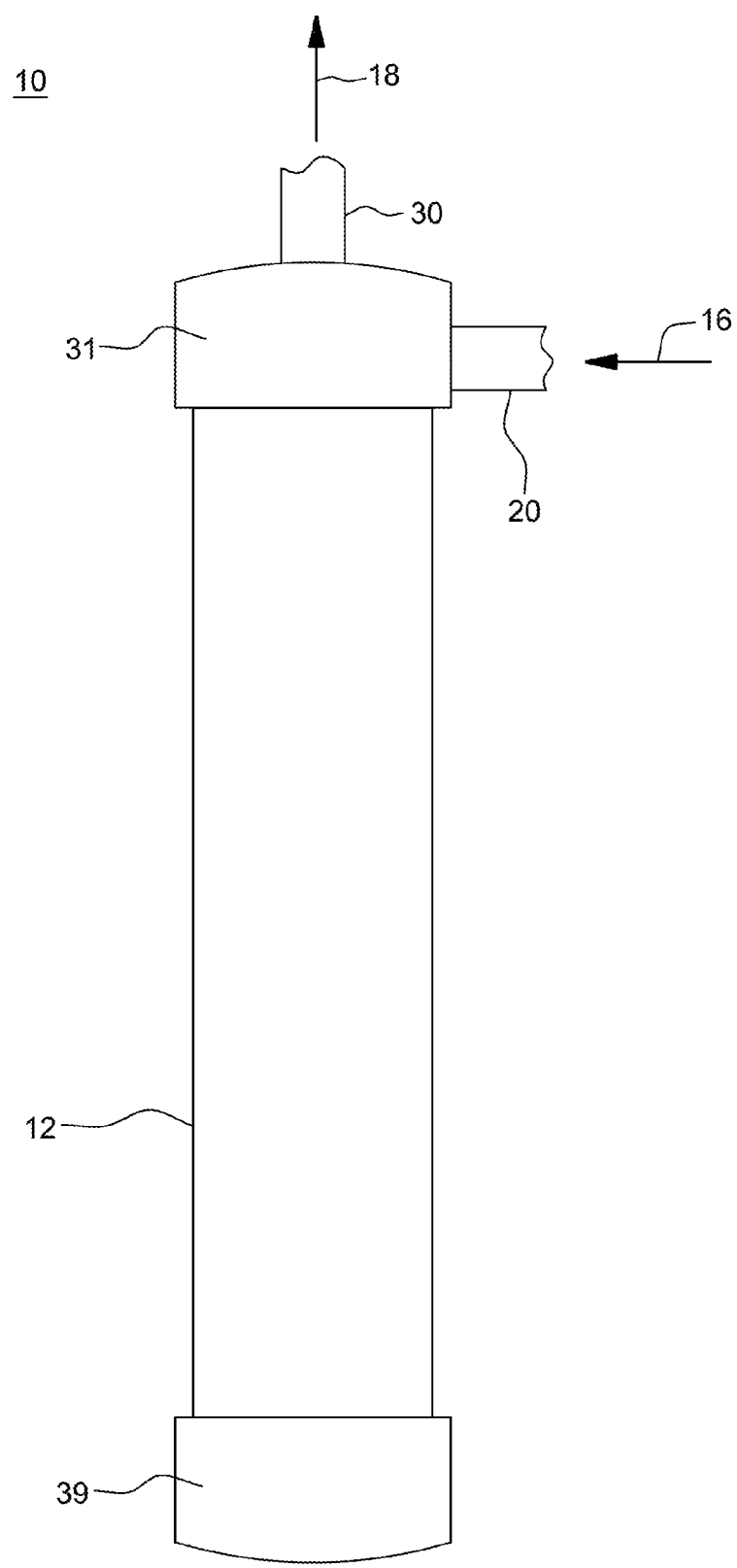
FIG. 1 is a side view of a mixing apparatus, in accordance with one or more aspects of the present invention.
Figure 2:
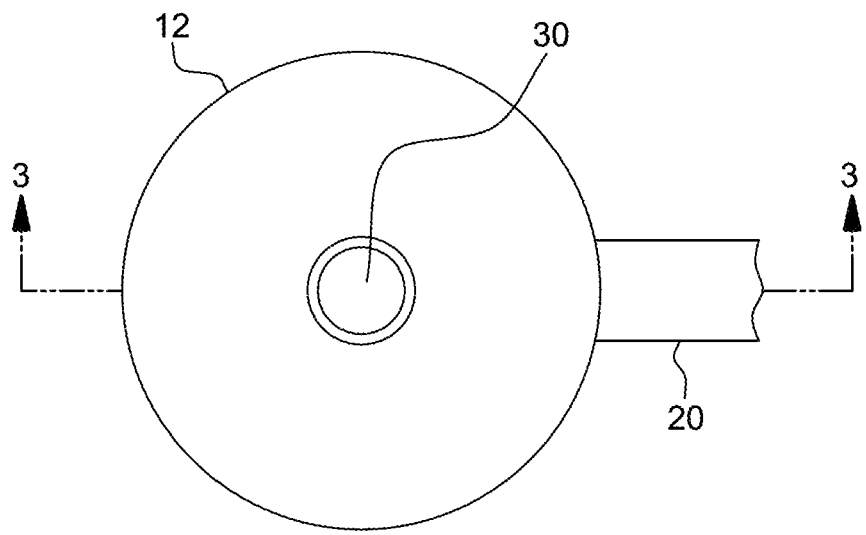
FIG. 2 is a top view of the mixing apparatus of FIG. 1, in accordance with one or more aspects of the present invention.
Figure 3:
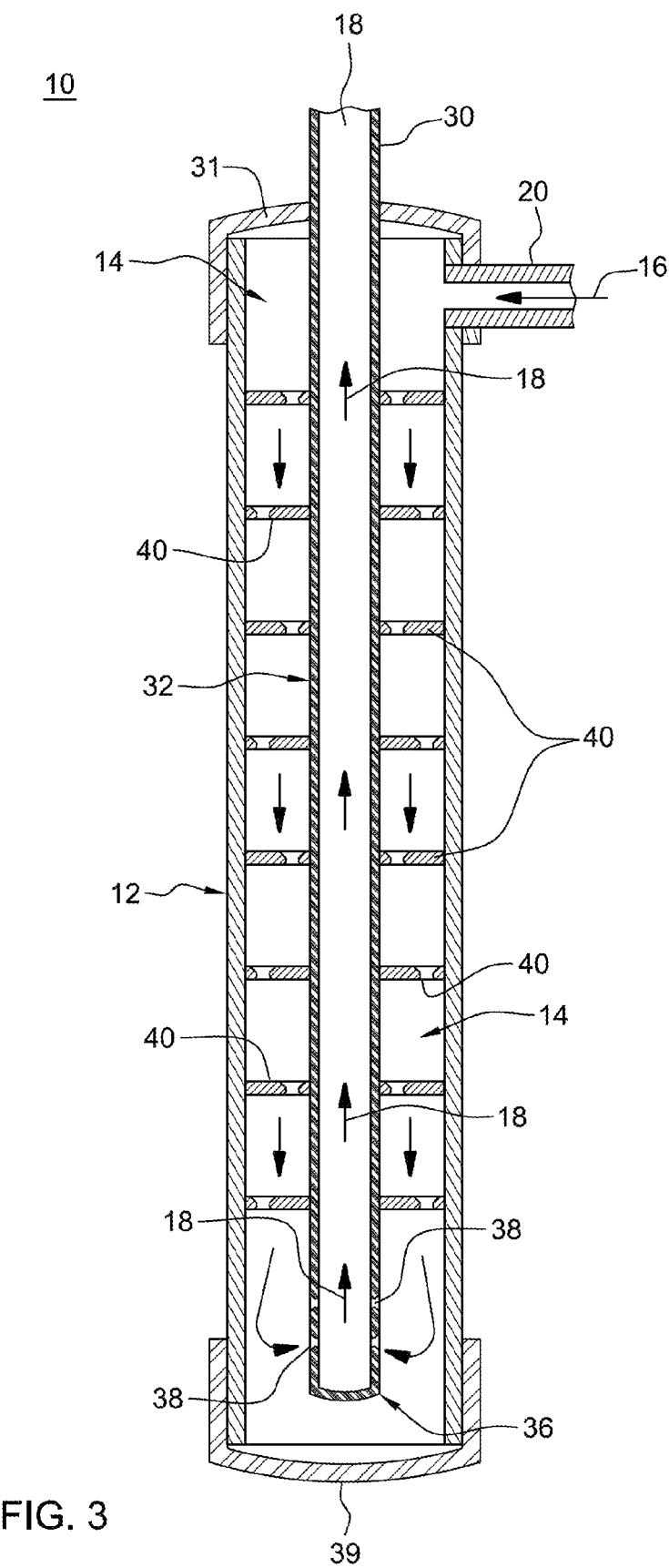
FIG. 3 is a cross-sectional view of the mixing apparatus taken along line 3-3 in FIG. 2, in accordance with one or more aspects of the present invention.

Referring to the drawings, wherein like reference numerals are used to indicate like or analogous components or steps throughout the several views, and with particular reference to FIGS. 1-3, there is illustrated an exemplary mixing apparatus 10. As best seen in FIGS. 1-3, mixing apparatus 10 includes a housing 12 having an inner chamber 14, an outlet conduit 32, an inlet 20, an outlet 30, and one or more dispersion plates 40. The housing 12, inner chamber 14, and outlet conduit 32 are illustrated as cylindrical tubes in the depicted embodiments, however alternative shapes are contemplated. In the depicted embodiment the inlet 20 is on a side (e.g., axial or longitudinal side) of housing 12 near a top 31 of housing 12 and outlet 30 is on the top 31 of housing 12, although other arrangements have been contemplated. Referring now to FIG. 3, the one or more dispersion plates 40 are evenly spaced apart along the inner chamber 32 and extend (e.g., substantially perpendicular) between the housing 12 and the outlet conduit 32. The bottom of the outlet conduit 32 is spaced apart from a bottom 39 of inner chamber 14 and extends from bottom 39 of inner chamber 32 of housing 12 and out of top 31 of inner chamber 32 of housing 12 by outlet 30. The outlet conduit 32 may have a cap 34 on bottom 39 of outlet conduit 32.

Figure 4:
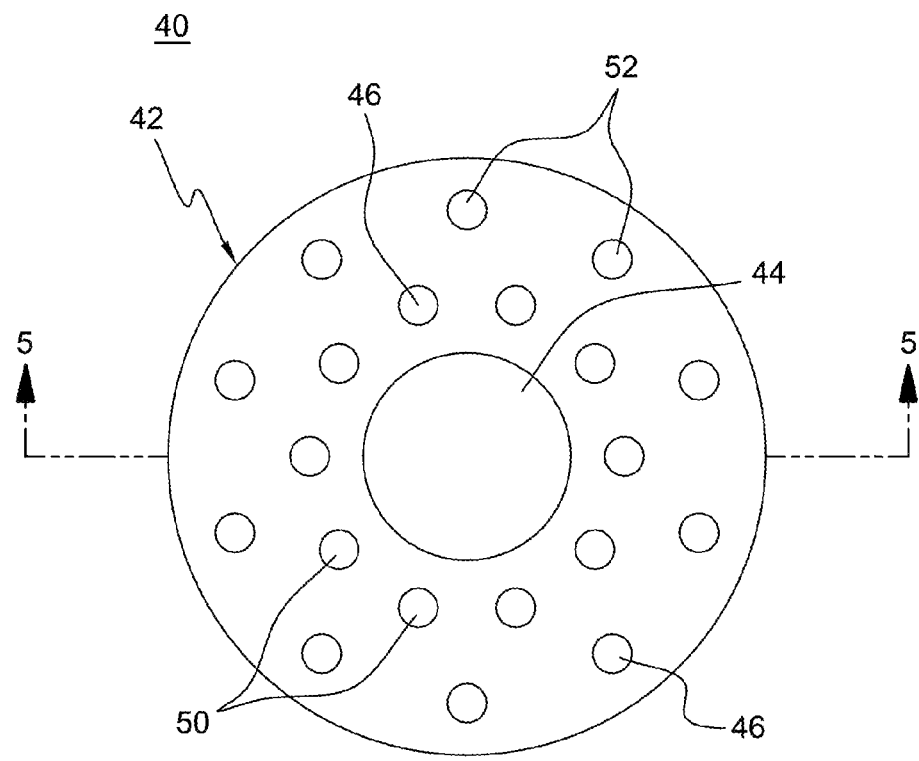
FIG. 4 is a top view of a dispersion plate in the mixing apparatus of FIGS. 1-3, in accordance with one or more aspects of the present invention.
Figure 5:
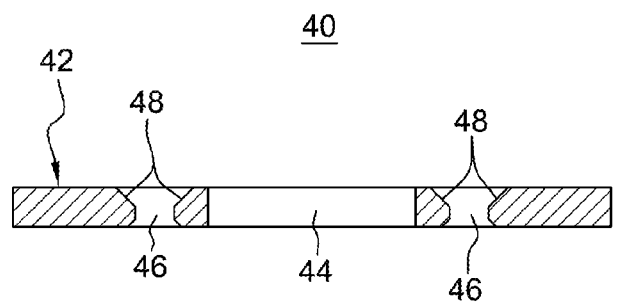
FIG. 5 is a cross-sectional view of the dispersion plate of FIG. 4 taken along line 5-5 in FIG. 4, in accordance with one or more aspects of the present invention.

FIGS. 4 and 5 illustrate dispersion members 40. As best seen in FIG. 4, dispersion plates 40 have a plate 42, a first opening 44, and a plurality of second openings 46. The first opening 44 may be of a size and shaped to fit around the outer circumference of outlet conduit 32 and inhibit the flow of inlet fluid 16 between first opening 44 and the outside of outlet conduit 32 (e.g., if the outlet conduit 32 is a 1" pipe having an outer diameter of 1.315" then the first opening 44 would be machined to about 1.320" in diameter). In the illustrated embodiment, the outer circumference of dispersion plates 40 engages the inner circumference of housing 12 and inhibits the flow of inlet fluid 16 between the inner circumference of housing 12 and the outer circumference of dispersion plates 40. In the depicted embodiment, plurality of openings 46 are located across plate 42 in two rings, an inner ring 50 and an outer ring 52. Other configurations for plurality of openings 46 across plate 42 are also contemplated. As illustrated in the depicted embodiment plurality of openings 46 has twenty openings and the twenty openings each have a diameter of about ¼". It is also contemplated that plurality of openings 46 may range from about 10 to 50 and the diameter of the openings would vary with number of openings such that the more openings the smaller the diameter and the fewer openings the larger the diameter. Although plurality of openings 46 are shown as round, other shapes are also contemplated.

As depicted in FIG. 5, plurality of openings 46 are bounded by chamfered edges 48 on both sides of plate 42. The angles of chamfered edges 48 may range from about 30 degrees to 60 degrees. Preferably the angles of chamfered edges 48 on both sides of plate 42 are about 45 degrees to reduce the possibility of shearing the polymers in the chemicals being mixed and diluted. The angles of chamfered edges 48 are described in greater detail hereinafter. In addition, chamfered edges 48 create a current in the fluids within inner chamber 14 to induce mixing of the chemical within the dilution fluid which enables full activation of the polymers in the chemical. The current in the fluids is formed by a vortex that is created within, and immediately adjacent to, plurality of openings 46 as the fluids pass through dispersion plates 40. It is also contemplated that only the top side 54 of plate 42 has chamfered edges and the chamfered top edges may range from about 30 to 60 degrees. The angle for chamfered edges 48 on only the top side 54 of plate 42 may preferably be 45 degrees. It is further contemplated that only the bottom side 56 of plate 42 has chamfered edges and the chamfered bottom edges may range from about 30 to 60 degrees. The angle for chamfered edges 48 on only the bottom side 56 of plate 42 may preferably be 45 degrees.

Figure 6:
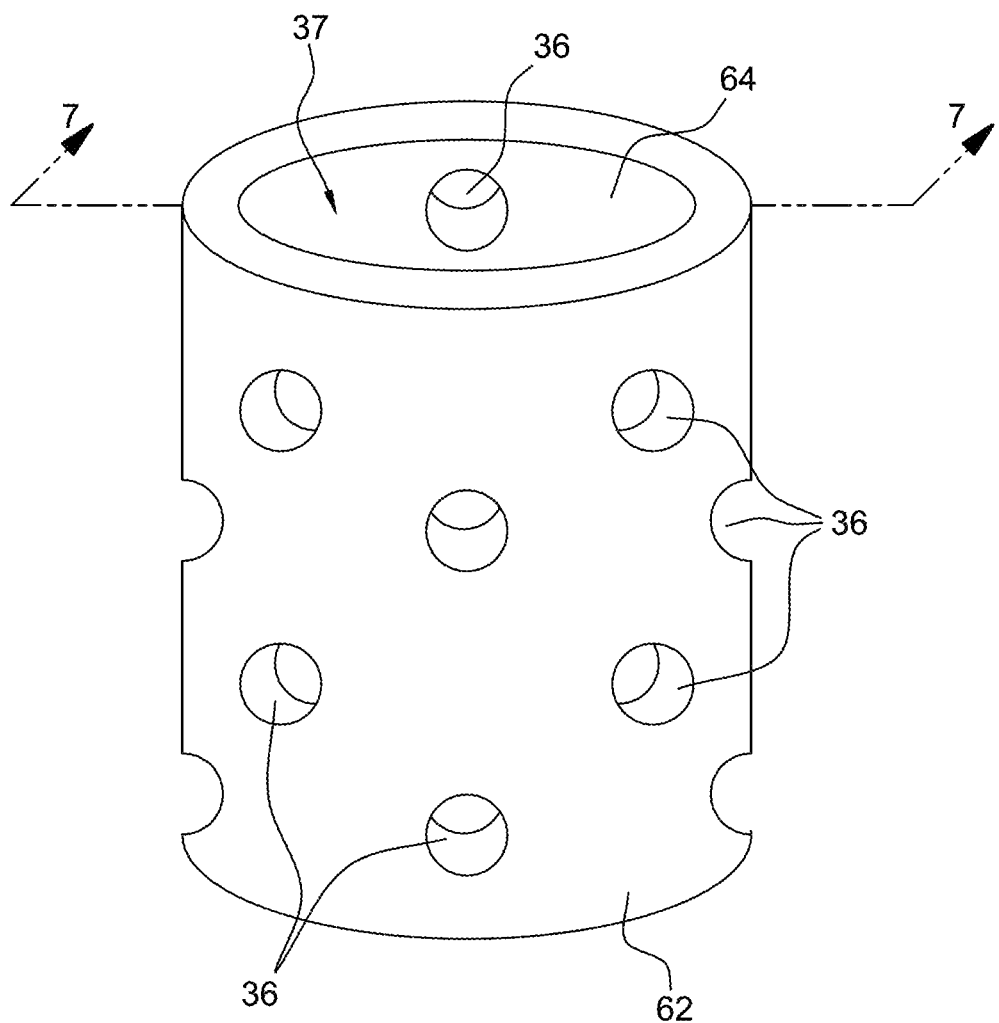
FIG. 6 is a perspective view of a cap, in accordance with one or more aspects of the present invention.
Figure 7:
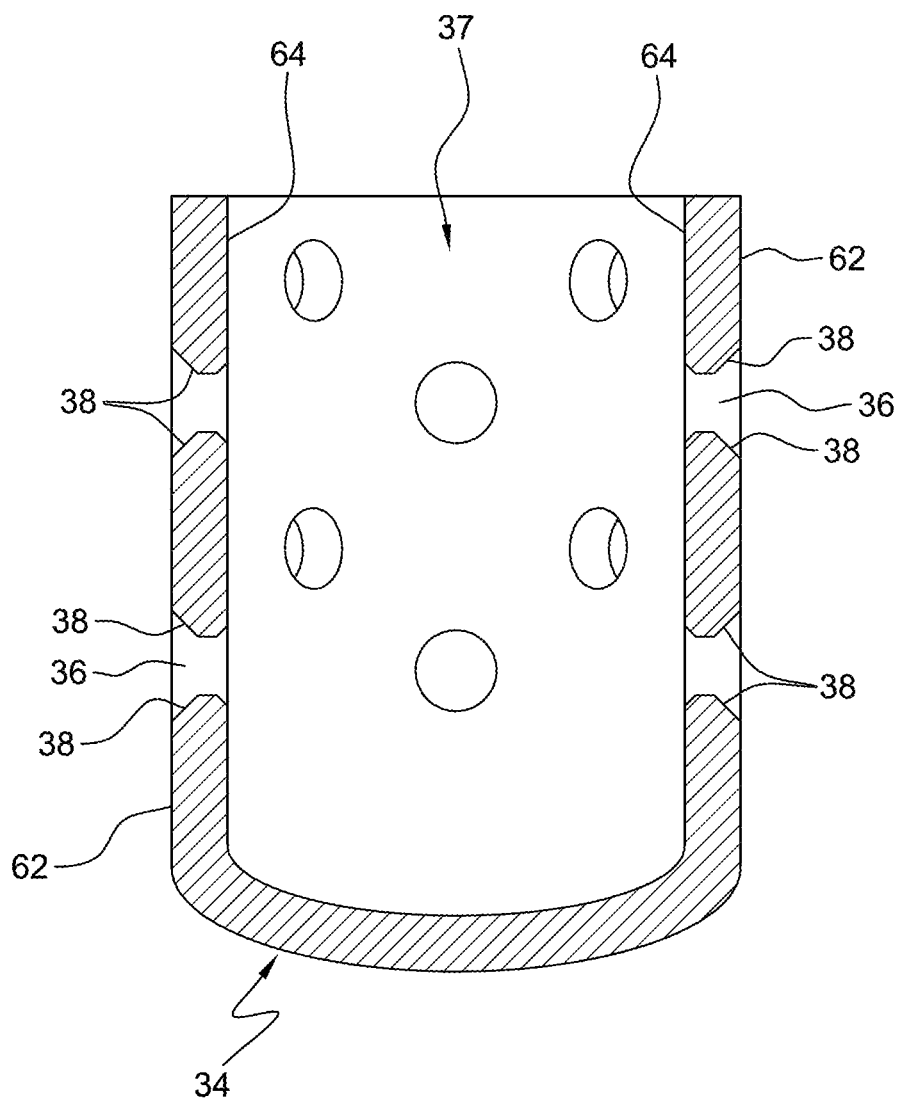
FIG. 7 is a cross-section view of the cap of FIG. 6 taken along line 7-7 in FIG. 6, in accordance with one or more aspects of the present invention.

As illustrated in FIGS. 6 and 7, a cap 34 may include one or more openings 36, which a fluid 16 passes through to enter outlet conduit 32, and a second opening 37. The second opening 37 provides the attachment means for securing cap 34 to outlet conduit 32. The cap 34 may be secured to outlet conduit 32 at second opening 37 by attachment means know in the art (e.g., with an adhesive, such as polyvinyl chloride cement). In the illustrated embodiment, the one or more openings 36 are located equally spaced apart around the outer surface of cap 34. It is also contemplated that one or more openings 36 may be located anywhere on cap 34, including a bottom 39 of cap 34. Referring now to FIG. 7, one or more openings 36 in cap 34 may have chamfered edges 38 to reduce the possibility of shearing the polymers in the chemicals being mixed and diluted. The angles of chamfered edges 38 may range from about 30 degrees to 60 degrees. Preferably the angles of chamfered edges 38 on both sides of cap 34 are about 45 degrees. The angles of chamfered edges 38 are described in greater detail hereinafter. The cap 34 is a cylinder in the illustrated embodiments, however other shapes are also contemplated.

Figure 8:
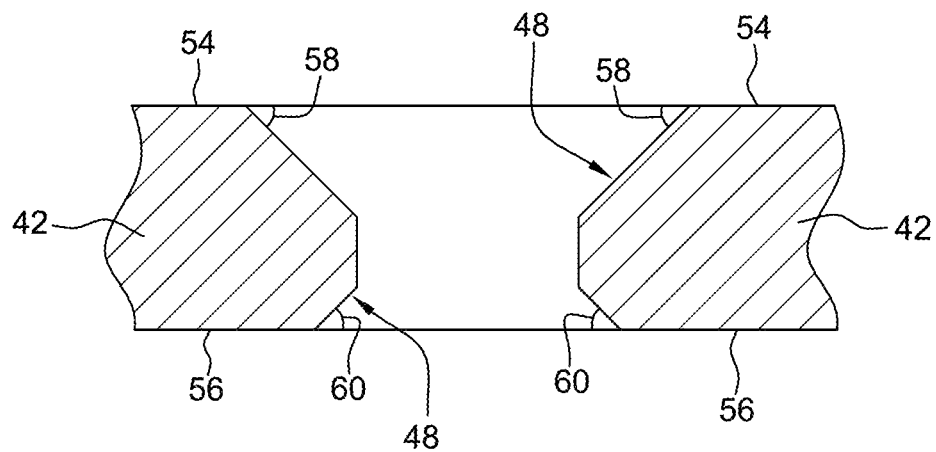
FIG. 8 is an enlarged cross-section view of one chamfered opening in the dispersion plate of FIGS. 4-5, in accordance with one or more aspects of the present invention.
Figure 9:
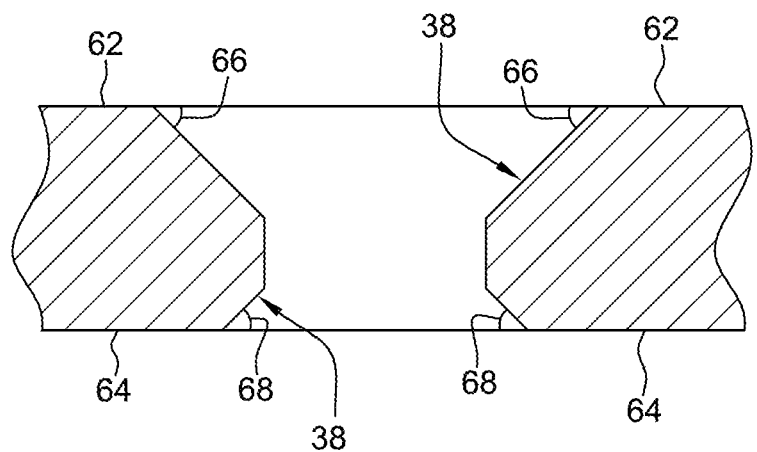
FIG. 9 is an enlarged cross-section view of one chamfered opening in the cap of FIGS. 6-7, in accordance with one or more aspects of the present invention.

As best seen in FIG. 8, the angles of chamfered edges 48 of dispersion plates 42 are created relative to a top side 54 of dispersion plates 42 and a bottom side 56 of dispersion plates 42. An angle 58 is created relative to top side 54 of and into dispersion plates 42 and may range from about 30 degrees to 60 degrees. Preferably angle 58 is about 45 degrees. An angle 60 is created relative to the bottom side 56 of and into dispersion plates 42 and may range from about 30 degrees to 60 degrees. Preferably angle 60 is about 45 degrees. Referring now to FIG. 9, the angles of chamfered edges 38 of cap 34 are created relative to an outer surface 62 of cap 34 and an inner surface 64 of cap 34. An angle 66 is created relative to outer surface 62 of and into cap 34 and may range from about 30 degrees to 60 degrees. Preferably angle 66 is about 45 degrees. An angle 68 is created relative to the inside surface 64 of and into cap 34 and may range from about 30 to 60 degrees. Preferably angle 68 is about 45 degrees.

Referring now to FIGS. 1-9, a chemical is injected or otherwise added to a dilution fluid prior to entering mixing apparatus 10. Although not described above, the chemical mixed with the dilution fluid per the method now being described could be, for example, polymer emulsions. The dilution fluid is typically water, but other dilution fluids known in the art may also be used. Once the chemical is injected into the dilution fluid, a blended fluid 16 is created. The blended fluid 16 flows into housing 12 under pressure (e.g., generally the pressure of the water entering the system which is typically "street" pressure of about 50-70 psi and should not exceed about 100 psi due to the construction materials) of mixing apparatus 10 at inlet 20. As blended fluid 16 enters housing 12 the blended fluid 16 flows into inner chamber 14 and fills inner chamber 14 around outlet conduit 32. As blended fluid 16 continues to fill inner chamber 14 the pressure from blended fluid 16 entering housing 12 at inlet 20 forces blended fluid 16 to flow through plurality of openings 46 in one or more dispersion plates 40. In the depicted embodiment, eight dispersion plates 40 are shown, although other numbers of dispersion plates 40 are also contemplated.

The plurality of openings 46 in each adjacent dispersion plate 40 are offset (e.g., axially or longitudinally relative to housing 12) from plurality of openings 46 in the prior dispersion plate 40 to inhibit blended fluid 16 from flowing straight down through plurality of openings 46 in each of dispersion plates 40 without inducing any mixing. As blended fluid 16 flows through each of the offset dispersion plates 40, blended fluid 16 flows through the plurality of openings 46 of one of dispersion plates 40 then contacts the surface of the subsequent dispersion plate 40 changing the flow pattern of blended fluid 16 and creating a current or flow to mix blended fluid 16. As blended fluid 16 passes through each of dispersion plates 40 the current created by blended fluid 16 interacting with dispersion plates 40 induces additional mixing of blended fluid 16.

After blended fluid 16 passes through each of dispersion plates 40 and reaches bottom 39 of inner chamber 14, blended fluid 16 then may pass through one or more openings 36 in cap 34 to enter outlet conduit 32. Once blended fluid 16 enters cap 34 and outlet conduit 32 mixing by dispersion plates 40 is substantially completed and blended fluid 16 is now mixed and diluted creating an outlet fluid 18. Outlet fluid 18 travels up through outlet conduit 32 due to the pressure of the fluids entering at inlet 20. Outlet fluid 18 then passes out of housing 12 at outlet 30 and is ready for use. The mixed and diluted outlet fluid 18 may be used for wastewater treatment, such as in the dewatering processes. For example, the dewatering process may mix outlet fluid 18 with wastewater sludge to encourage coagulation, flocculation, and separation of solids from the sludge water. As the water pressure of the fluids at inlet 20 provides the necessary pressure to move and mix blended fluid 16 and outlet fluid 18 through mixing apparatus 10, mixing apparatus 10 does not require additional energy to mix the chemicals and dilution fluid and no moving parts are needed for the mixing process. The flow rate of the fluids at inlet 20 may be controlled by a valve which in turn controls the pressure exerted on the fluids as they pass through mixing apparatus 10.

Alternatively, mixing apparatus 10 could be used in individual residential water systems to remove contaminants, for example sulfur or water hardness, from the water before it is dispersed throughout the residence for use. The incoming water would be mixed with a chemical, such as hydrogen peroxide, to form blended fluid 16 as described above. As the blended fluid 16 passes through dispersion plates 40, as described above, the chemical oxidizes the contaminants in the water thereby removing the contaminants before the water is dispersed throughout the home for use. Once the blended fluid 16 has reached the bottom 39 of inner chamber 14 it enters cap 34 and creates outlet fluid 18, as described above, which then exits through outlet conduit 32 at outlet 30 and may then pass into the pipes of the residence for distribution as needed.

The invention has been described with reference to the preferred embodiments as well as several alternative embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the invention be construed as including all such modifications and alterations.

The invention claimed is:

1. A mixing device for mixing one or more fluids, comprising:
   a housing having an inner chamber, an inlet, and an outlet;
   an outlet conduit having a first end and a second end, the second end of the outlet conduit providing fluid communication between the inner chamber of the housing and the outlet;
   one or more dispersion members configured to mix one or more fluids, the one or more dispersion members extending between the outlet conduit and the housing; and
   a cap substantially enclosing the first end of the outlet conduit with respect to the inner chamber of the housing;
   wherein the cap has one or more openings extending therethrough for the passage of the one or more fluids and the one or more openings of the cap have chamfered edges.

2. The mixing device of claim 1, wherein the one or more dispersion members have a first opening for receiving the outlet conduit.

3. The mixing device of claim 2, wherein the one or more dispersion members have a plurality of second openings.

4. The mixing device of claim 3, wherein the plurality of second openings in the one or more dispersion members have a first side and a second side.

5. The mixing device of claim 4, wherein at least one of the first side and the second side of the plurality of second openings in the one or more dispersion members are chamfered to inhibit shearing of a plurality of polymers in the one or more fluids.

6. The mixing device of claim 5, wherein the first side of the plurality of second openings has an angle between 30 to 60 degrees relative to a top surface of the one or more dispersion members and the second side of the plurality of second openings has an angle between 30 to 60 degrees relative to a bottom surface of the one or more dispersion members.

7. The mixing device of claim 5, wherein the first side of the plurality of second openings has an angle of about 45 degrees relative to a top surface of the one or more dispersion members and the second side of the plurality of second openings has an angle of about 45 degrees relative to a bottom surface of the one or more dispersion members.

8. The mixing device of claim 5, wherein the plurality of second openings in a first dispersion member of the one or more dispersion members is axially offset relative to an axis of the outlet conduit from the plurality of second openings in a second adjacent dispersion member of the one or more dispersion members to facilitate mixing of the one or more fluids.

9. The mixing device of claim 5, wherein the plurality of second openings in the one or more dispersion members is axially offset relative to an axis of the outlet conduit from the plurality of second openings in an adjacent dispersion member of the one or more dispersion members to facilitate mixing of the one or more fluids.

10. The mixing device of claim 1, wherein the housing has a first end and a second end, the inlet located at the first end, and the outlet located at the first end.

11. The mixing device of claim 10, wherein the inlet comprises an opening on an axial side of the first end of the housing to allow a flow of the one or more fluids into the inner chamber.

12. The mixing device of claim 10, wherein the outlet conduit provides fluid communication between the inner chamber at the first end of the outlet conduit and the outlet at the second end of the outlet conduit.

13. The mixing device of claim 10, wherein the outlet conduit is axially centered in the inner chamber of the housing relative to an axial dimension of the housing.

14. The mixing device of claim 10, wherein the outlet conduit extends from the second end of the housing to the first end of the housing and is spatially separated from the second end of the housing.

15. The mixing device of claim 1, wherein the cap includes one or more openings are angled relative to a longitudinal axis of the outlet conduit.

16. A dispersion member system of a mixing device for mixing one or more fluids, comprising:
   at least one plate having a first side and a second side, each plate of the at least one plate further comprising:
      a first opening in the plate for receiving an outlet conduit of the mixing device; and
      a plurality of second openings in the plate, the plurality of second openings having a first side and a second side, and wherein the first side and the second side of the plurality of second openings have chamfered edges and the chamfered edges surround the entire opening of the plurality of second openings; and
   a cap for enclosing the outlet conduit with one or more openings extending therethrough for passage of one or more fluids, wherein the one or more openings have chamfered edges.

17. The mixing device of claim 1, wherein the cap is coupled directly to the first end of the outlet conduit.

18. The mixing device of claim 1, wherein the cap has one or more openings extending through a side wall of the cap for the passage of the one or more fluids.

* * * * *

UNITED STATES PATENT AND TRADEMARK OFFICE
CERTIFICATE OF CORRECTION

| | | |
|---|---|---|
| PATENT NO. | : 9,010,995 B2 | Page 1 of 1 |
| APPLICATION NO. | : 13/422785 | |
| DATED | : April 21, 2015 | |
| INVENTOR(S) | : Michael J. Soukup | |

It is certified that error appears in the above-identified patent and that said Letters Patent is hereby corrected as shown below:

In the Claims,

Column 6, Line 40, Claim 15, Delete "where the cap includes" and insert --wherein the--

Signed and Sealed this
First Day of September, 2015

Michelle K. Lee
*Director of the United States Patent and Trademark Office*